United States Patent
Farrell

[11] 3,893,793
[45] July 8, 1975

[54] MOLDING APPARATUS WITH TEMPERATURE COMPENSATING CORE RODS

[75] Inventor: John J. Farrell, Green Brook, N.J.

[73] Assignee: Farrell Patent Company, Dunellen, N.J.

[22] Filed: Mar. 23, 1973

[21] Appl. No.: 344,128

[52] U.S. Cl. .............. 425/242 B; 425/DIG. 209-425/DIG. 211
[51] Int. Cl. ............................................ B29d 23/03
[58] Field of Search .......... 415/DIG. 209, DIG. 211, 415/DIG. 213, 242 B, 387 B, 324 B, 326 B, 342, DIG. 204, 249, 468; 249/63, 64, 122; 164/370

[56] References Cited
UNITED STATES PATENTS

| | | | |
|---|---|---|---|
| 2,864,124 | 12/1958 | Strauss | 425/387 B |
| 3,100,913 | 8/1963 | Matteo | 425/DIG. 209 X |
| 3,264,684 | 8/1966 | Moslo | 425/DIG. 209 X |
| 3,667,887 | 6/1972 | Reiss | 425/387 B X |
| 3,733,162 | 5/1973 | Farkas | 425/DIG. 211 X |

Primary Examiner—Andrew R. Juhasz
Assistant Examiner—David B. Smith
Attorney, Agent, or Firm—Sandoe, Hopgood & Calimafde

[57] ABSTRACT

This molding apparatus has a head which carries a plurality of core rods extending from the face of the head, and it has each core rod carried by a floating support that permits movement of the core rods closer together or further apart. Core rods are held in bushings which have flanges that maintain the core rods parallel to one another. The movement permits the spacing of the core rods to change as necessary to compensate for changes in the spacing of the mold cavities as temperature differences between the mold and the head that carries the core rods causes the core rods and mold cavities to have different center line spacings.

9 Claims, 9 Drawing Figures

PATENTED JUL 8 1975  3,893,793
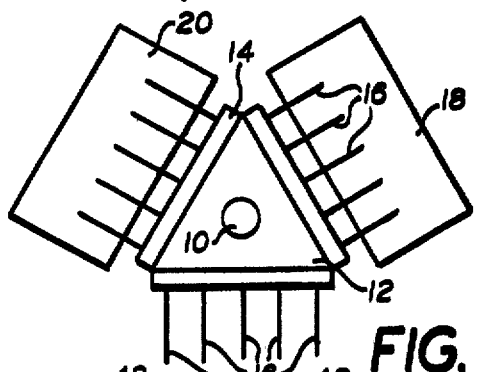
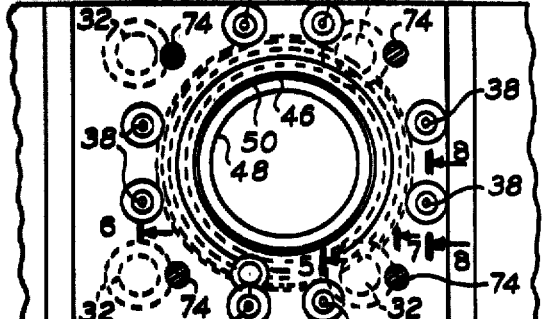
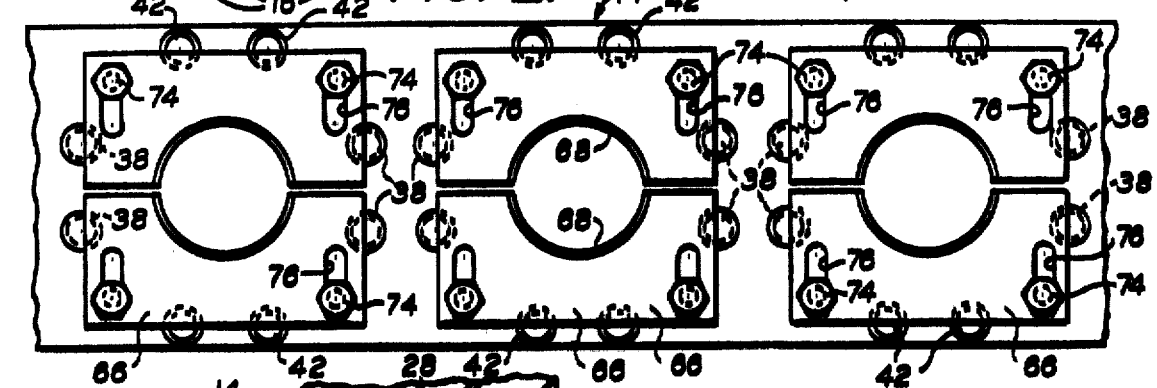
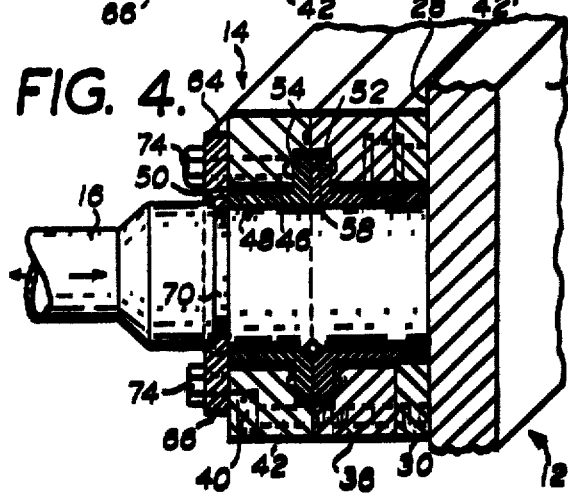
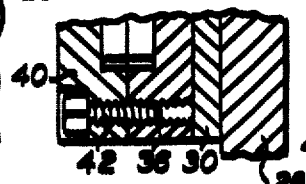
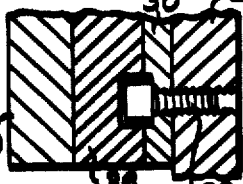
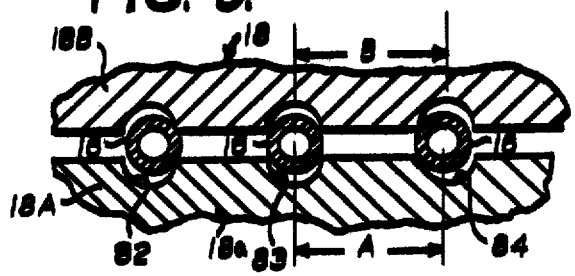

MOLDING APPARATUS WITH TEMPERATURE COMPENSATING CORE RODS

BACKGROUND AND SUMMARY OF THE INVENTION

Molding machines which have multi-cavity molds and a plurality of core rods carried by a supporting head encounter a problem as the mold temperature increases substantially above that of the head that carries the core rods. Even though the center line spacing of the mold cavities is exactly the same as that of the core rods when the mold and head are at the same temperature, the cavity spacings become somewhat greater than the core rod spacings when the mold becomes heated to a substantially higher temperature than the core rod holder. When the mold closes on the core rods, the end core rods are forced out of parallelism and one side of the molded article is made thicker than the other side.

This problem is particularly acute with blow molding apparatus which utilizes an indexing head having a plurality of angularly spaced faces and molds located at angular spacing corresponding to the angular relation of the faces of the turret head. Such machines have an injection mold where a parison is applied to the core rods and where the temperature is extremely high. The indexing head which carries the core rod holders is at or close to ambient temperature of the environment in which the molding apparatus is being used. The indexing head carries the coated core rods to a blowing mold which operates at a lower temperature than the injection mold but still at a temperature substantially more than ambient.

This invention attaches the core rods to the head with bearing means that hold the core rods parallel to one another but which permit a limited movement of the core rods with respect to the head and with respect to one another in directions normal to the axes of the core rods so that when the mold closes on core rods which are not at exactly the same spacings as the mold cavities, the closing of the mold moves the core rods laterally to correspond to the spacing of the cavities while the parallelism of the core rods is maintained.

In the preferred construction, the core rods fit into bushings, and each bushing has a circumferential flange which fits into a counterbore having a diameter somewhat greater than the diameter of the flange. The opening in the core rod holder through which the bushing extends also has a diameter somewhat larger than the outside diameter of the bushing. This permits the core rod holder and bushing to move as a unit in directions radially and normal to the axis of the bushing and core rod. A cover element closes the otherwise open end of the counterbore and contacts with the face of the flange which is on the opposite side of the face which contacts with the counterbore. The flange is thus held in a groove which permits radial movement but prevents any canting of the flange which would permit the core rod to move out of parallelism with other core rods.

Core rods are held against axial movement by retainers which fit into circumferential grooves in the core rods in accordance with conventional practice. The holder in which the core rod bushings are supported are preferably made with a plurality of plates connected together by fastening means and correlated in such a way that they can be connected with the indexing head or removed and replaced by other plates for receiving core rods of different sizes as may be necessary for different molds, depending upon the article to be produced.

Other objects, features and advantages of the invention will appear or be pointed out as the description proceeds.

BRIEF DESCRIPTION OF DRAWINGS

In the drawing, forming a part hereof, in which like reference characters indicate corresponding parts and all the views;

FIG. 1 is a fragmentary diagrammatic view of a blow molding machine viewed from the top so as to show the indexing head on which the core rods are carried and the molds with which the core rods cooperate;

FIG. 2 is a fragmentary, greatly enlarged, front view of one face of the indexing head as shown in FIG. 1;

FIG. 3 is a fragmentary front view of a portion of the structure shown in FIG. 2 but with the retaining means removed;

FIG. 4 is a sectional view taken on the lines 4—4 of FIG. 3 and with a core rod located in the holder;

FIGS. 5-8 are sectional views taken on the lines 5—5; 6—6; 7—7; and 8—8, respectively, of FIG. 3, the sectional views being somewhat enlarged for clearer illustration; and FIG. 9 is a diagrammatic view showing the way in which the core rod spacing is adjusted by the closing of a mold.

DESCRIPTION OF PREFERRED EMBODIMENT

FIG. 1 shows a molding apparatus with a center shaft 10 which carries an indexing head 12 that has three faces, each of which supports a core rod holder 14. In the construction illustrated, there are five core rods 16 projecting from each of the faces of the indexing head for successive cooperation with an injection mold 18 and a blowing mold 20.

The indexing head is rotated about the axis of the shaft 10 and moves 120° with each operation. This permits the core rods 16 which have received their parisons to be carried to the blowing mold 20 while the core rods 16 which have been blown move to the lowermost position in FIG. 1 which constitutes a stripping station. Core rods from which blown articles have been stripped move from the stripping station to the injection mold 18 in accordance with conventional practice. Such molding apparatus is well-known and no further description of it is necessary for a complete understanding of this invention. It will be understood, however, that the invention herein described is not limited to blow molding machines of the type shown in FIG. 1; but can be used with any type of molding apparatus where a plurality of core rods are used in multi-cavity molds and are carried by a common head.

The core rod holder 14 is best shown in FIGS. 2 and 4. In FIG. 2 there is no core rod in the holder, whereas FIG. 4 shows the end of a core rod 16 located in the holder.

FIG. 4 shows a frame 26 which comprises one of the sides of the indexing head 12. The frame 26 has an outside face 28 to which the core rod holder 14 is connected. The core rod holder includes a mounting plate 30 which is secured to the frame 26 by screws 32, best shown in FIGS. 3 and 6.

3

In front of the mounting plate 30, there is a second plate 36 which is attached to the mounting plate by screws 38, best shown in FIGS. 3 and 8.

A third plate 40 is attached to the second plate 36 by screws 42, shown in FIGS. 3, 4 and 5. An opening 46 extends through the second and third plates 36 and 40, respectively, and preferably through the mounting plate 30 also.

A bushing 48 extends through the opening 46 and the outside diameter of the bushing 48 is somewhat smaller than the diameter of the opening 46 so that there is a clearance 50 between the bushing 48 and the surface of the opening 46 when the bushing is centered in the opening 46.

The bushing 48 is preferably made in two sections. The right-hand section, in FIG. 4, has a flange 52 at its left-hand end, and left-hand section of the bushing 48 has a flange 54 at its right-hand end.

The flange 52 is located in a counterbore 58 at the end of the portion of the opening 46, which extends through the second plate 36. The flange 54 is located in a complementary counterbore in the end of the portion of the opening 46 that extends through the third plate 40. It will be evident that the counterbore in either of these plates 36 and 40 could be made deeper so as to receive both of the flanges 54 and 52. It will also be evident that the bushing 48 could be made in just one section with an integral one-piece flange on the outside of the bushing and at a location midway between the ends of the bushing as are the flanges 54 and 52. The construction illustrated is representative of a counterbore for receiving a flange of the bushing 48 with a cover plate that holds the flange against the end of the counterbore. The construction thus provides a groove into which the flanges of the bushing fit and are held against canting movement by the surfaces of the plates 36 and 40 contacting with the flanges 54 and 52 with running clearance between the confronting faces of the plates and the flanges so that the flanges can move on the plates 36 and 40, as bearings or bearing surfaces, in directions in a plane normal to the longitudinal axis of the bushing 48. The flanges cannot tilt, however, so as to permit the bushing 48 to move out of its parallel relationship with other bushings of the core rod holder.

The counterbore 58 and the complementary counterbore in the plate 40 form a circumferential groove which has a diameter slightly greater than the outside diameter of the flanges 54 and 52 by an amount at least great enough to permit the bushing 48 to move to its limits of travel within the oversize opening 46 through which the bushing passes. It will be evident that this construction permits movement of the bushing 48 normal to its axis in any direction but maintains the axis of the bushing against any tilting movement. The core rod 16 has an end portion which fits snugly in the busning 48; and in the construction illustrated, the end of the core rod bottoms against the face 28 of the frame 26 of the indexing head 12. The core rod 16 is retained in the holder 14 by retaining means comprising two retaining elements 64 and 66 (FIG. 2 and FIG. 4) which have arcuate portions 68 that extend into a groove 70 formed in the circumference of the core rod 16. The core rod retainers 64 and 66 are secured to the third plate 40 by screws 74, which thread into the third plate 40. These screws 74 extend through slots 76 in the retainer elements 64 and 66 so that the retainer elements can be adjusted toward and from one another to determine the distance that they extend into the groove 70 (FIG. 4) in the core rod 16. Since the retainer elements 64 and 66 are fixedly secured to the core rod holder 14, when the holding apparatus is in operation, it is necessary to have sufficient clearance between the arcuate edges 68 of the retainers 64 and 66 and the bottom of the groove 70 sufficient to permit the core rod to move with the bushing without having the bottom of the groove 70 contact with the arcuate edges 68.

FIG. 9 is a diagrammatic view showing the way in which the core rods 16 have their spacing adjusted by the closing of the mold 18. This mold has a lower section 18A which may be fixed, and an upper section 18B which moves toward and from the lower section 18A. The core rods 16 move upward one-half as much as the upper mold section 18B and far enough to clear the ends of the cavities 82, 83 and 84. FIG. 9 shows the mold 18 partially closed.

The center line spacings of the core rods 16 is indicated by the dimension arrow A. The center line spacing of the ends of the cavities is indicated by the dimensional arrow B. Because of the higher temperature, and resulting expansion, of the mold 18, the dimension B is somewhat greater than A. Thus, with the center core rod 16 located in alignment with the center of the cavity 83, the core rod 16 at the cavity 84 will be off-center towards the left; and the core rod 16 for the mold cavity 82 will be off-center toward the right.

Because of the fact that these off-center distances amount to only a few thousandths of an inch, the sides of the core rods 16, which are off-center, come against the sides of the mold cavity somewhat below a horizontal center line through the core rods, but substantially removed from a vertical line through the core rods, so that the contact of the core rods with the sides of the respective cavities exerts a camming action which thrusts the core rods progressively closer to the center of the mold cavity as the mold closes. This camming action or side thrust on the core rods causes the bushing 48 (FIG. 4) to move sideways in the counterbore 58 to increase the center line spacing between the core rods without interfering with parallel relationship to one another.

The preferred embodiment of the invention has been illustrated and described, but changes and modifications can be made, and some features can be used in different combinations without departing from the invention as defined in the claims.

I claim:

1. Molding apparatus including a head having a side face, a mold adjacent to said face and having spaced apart openings opposing said face, core rods carried by the head and projecting therefrom for extending into said openings in the mold, holders carried by the head for supporting the core rods, and bearings in the holders and on the core rods, said bearings and holders having surfaces confronting one another and extending substantially normal to the longitudinal axes of the core rods for holding the core rods that extend from said face in parallel relation to one another, the bearing and holder surfaces having relative movement with respect to one another and the care rods having relative movement with respect to the head and normal to said axes for changing the spacings of the core rods from one another to compensate for differences between the temperature of the head and the temperature of the mold and the resulting changes in the spacings of the openings in the mold into which the core rods must extend.

2. The molding apparatus described in claim 1, characterized by the head being an indexing head and having bearing means in which it is movable angularly about a center axis, and having a plurality of side faces at angularly spaced locations around said axis, and a plurality of molds located around the center axis adjacent to the respective faces of the indexing head, the angular spacing of the molds from one another being substantially equal to those of the faces of the head, each of the faces of the indexing head having a holder and a plurality of core rods extending therefrom and with independent bearings for each of the core rods.

3. The molding apparatus described in claim 1, characterized by each of the core rods including a bushing through which the rest of the core rods extends, a flange extending from each bushing in a direction substantially normal to the longitudinal axis of the bushing, the flange of each bushing fitting into said bearing surfaces of the holder with a running clearance and in which the flange being movable in directions normal to the longitudinal axis of the core rod.

4. The molding apparatus described in claim 1, characterized by a shoulder on the core rod, and including retaining means for the core rods carried by the holder and cooperating with the shoulder on the core rod to prevent the core rod from moving axially out of the holder.

5. The molding apparatus described in claim 4, characterized by the retaining means comprising two retaining elements, the shoulder on the core rod extending around the circumference of the core rod, and detachable fastening means for holding the retaining elements in position after they have been brought into cooperative relation with the shoulder by movement in the direction of radii of the core rod.

6. The molding apparatus described in claim 5, characterized by a circumferential groove in the core rod, the sides of which provide two shoulders on the core rod, the retaining elements comprising plates of a thickness to fit into the core rod groove with a snug fit to prevent axial movement of the core rod in either direction.

7. The molding apparatus described in claim 1, characterized by the core rod including a bushing through which the rest of the core rod extends, a flange extending from the outside of the bushing, an opening in the holder and through which the bushing extends, a counterbore at one end of the opening in the holder for receiving the flange, and a cover element of the holder that covers the side of the flange at the otherwise open end of the counterbore, the diameter of the opening through which the bushing extends being somewhat larger than the diameter of the bushing, and the diameter of the counterbore being somewhat larger than the outside diameter of the flange, whereby the bushing, flange and core rod are free to move radially with respect to the head and within the limits imposed by the differences in diameters of the elements of the combination.

8. The molding apparatus described in claim 7, characterized by the bushing being in two sections with a flange at the end of each section, the two sections being oriented so that their flanges are at adjacent ends, and at an intermediate location between the opposite ends of the entire bushing, the element having the counterbore therein and the cover element being continuous across a face of the head and having a plurality of spaced openings for receiving a plurality of core rods.

9. The molding apparatus described in claim 8, characterized by the holder including a mounting plate and detachable fastening means securing the mounting plate to the face of the head, a second plate detachably connected to the mounting plate, said second plate being the plate through which the opening with the counterbore extends, a third plate which is the cover element and which has a core-receiving opening with a counterbore that faces the counterbore of the second plate to form a circumferential groove for receiving the flanges of the two sections of the bushing, said sections of the bushing being held in alignment with one another by the portion of the core rod that extends through the openings through the bushing and through the second and third plates and through a corresponding aligned opening in the mounting plate, a circumferential groove in the core rod at the end of the third plate which is remote from the second plate, retainer elements attached to the third plate with arcuate edge portions that fit into the circumferential groove of the core rod, screws that hold the retaining means on the third plate, said screws extending through the slots in the retaining means, so that the retaining means can be adjusted toward and from one another to control the extent of the retaining means into the circumferential groove and thus provide clearance for movement of the core rod with respect to the retaining means in directions normal to the axis of the core rod.

* * * * *